(12) United States Patent
Petrina

(10) Patent No.: US 6,612,556 B2
(45) Date of Patent: Sep. 2, 2003

(54) MULTIHELICAL COMPOSITE SPRING

(75) Inventor: Petru Petrina, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 34 days.

(21) Appl. No.: 09/845,841

(22) Filed: Apr. 30, 2001

(65) Prior Publication Data

US 2002/0158392 A1 Oct. 31, 2002

(51) Int. Cl.[7] ................................................ F16F 3/02
(52) U.S. Cl. ................................. 267/168; 267/289
(58) Field of Search ..................... 267/168, 289, 267/236–238, 290, 143, 144, 148, 149, 151

(56) References Cited

U.S. PATENT DOCUMENTS

| | | | | |
|---|---|---|---|---|
| 3,933,345 A | * | 1/1976 | Fidi et al. | 267/168 |
| 4,380,483 A | | 4/1983 | Kliger | 156/169 |
| 4,473,217 A | | 9/1984 | Hashimoto | 267/149 |
| 4,544,610 A | | 10/1985 | Okamoto et al. | 428/611 |
| 4,765,602 A | | 8/1988 | Roeseler | 267/148 |
| 4,858,897 A | | 8/1989 | Irifune | 267/181 |
| 4,895,352 A | | 1/1990 | Stumpf | 267/80 |
| 4,901,987 A | | 2/1990 | Greenhill et al. | 267/166 |
| 5,014,004 A | * | 5/1991 | Kreibich et al. | 267/168 |
| 5,052,404 A | * | 10/1991 | Hodgson | 267/155 |
| 5,062,619 A | | 11/1991 | Sato | 267/154 |
| 5,165,421 A | * | 11/1992 | Fleischhacker et al. | 138/130 |
| 5,192,057 A | | 3/1993 | Wydra et al. | 267/153 |
| 5,222,718 A | | 6/1993 | Buck | 267/162 |
| 5,516,085 A | | 5/1996 | Piepenstock | 267/166 |
| 5,549,370 A | | 8/1996 | Folsom | 267/149 |
| 5,558,393 A | | 9/1996 | Hawkins et al. | 267/162 |
| 5,562,275 A | * | 10/1996 | Weissenfluh et al. | 267/155 |
| 5,622,358 A | | 4/1997 | Komura et al. | 267/166 |
| 5,639,074 A | | 6/1997 | Greenhill et al. | 267/162 |
| 5,651,480 A | | 7/1997 | Piepenstock | 222/341 |
| 5,882,264 A | * | 3/1999 | Yabe et al. | 192/203 |
| 5,944,302 A | | 8/1999 | Loc et al. | 267/180 |
| 6,068,250 A | | 5/2000 | Hawkins et al. | 267/162 |

* cited by examiner

*Primary Examiner*—Pam Rodriguez
(74) *Attorney, Agent, or Firm*—Schwegman, Lundberg, Woessner & Kluth, P.A.

(57) ABSTRACT

A single spring unit includes a multi-helical spring formed of composite material. The single spring unit includes multiple layers of composite material disposed in a first helical configuration, and multiple layers of composite material in a second helical configuration interwoven with one another, and coupled together to form the single spring unit.

16 Claims, 5 Drawing Sheets

MULTIHELICAL COMPOSITE SPRING

TECHNICAL FIELD

The present invention relates generally to springs. More particularly, the present invention relates to multihelical springs.

BACKGROUND

Springs are used extensively in many industries for their dynamic and mechanical properties. For example, large scale springs are used in the automotive industry, or smaller scale springs are used for smaller electronic and/or mechanical devices. Steel springs have been often used in light of their quality of fabrication, stiffness, strength, and their ability to be mass produced. However, steel springs tend to be relatively heavy, and disadvantageous to use in certain applications given their weight. For example, in applications such as automobiles, airplanes, and railway cars, it is critical to reduce the weight of various components to reduce the overall weight of the apparatus. Other drawbacks of steel springs are that they have limited corrosion resistance, fatigue strength, have a high coefficient of thermal expansion, have magnetic properties, and are electrically conductive.

One approach to some of the drawbacks of steel springs is to form single helical springs from composite materials. Single helical springs formed of composite materials have been developed, to take advantage of light weight characteristics of plastic materials. However, these types of springs fail to provide sufficient stiffness to replace steel springs. A single helical spring is a torsion bar wrapped into a helical form, and the stiffness of a torsion bar is determined by the shear modulus of elasticity of the material. As the shear modulus of composite materials is much smaller than the shear modulus of steel, the stiffness of a single helical composite spring is much less than that of a steel single helical spring.

Accordingly, what is needed is a lightweight spring capable of providing sufficient stiffness for a wide variety of applications. What is further needed is a spring which has an improved resistance to fatigue and corrosion.

SUMMARY

A helical spring includes one or more layers of material distributed in a first helical coiled configuration, the first helical coiled configuration extending from a first end to a second end and wound in a first direction. The helical spring further includes one or more layers of material distributed in a second helical coiled configuration, the second helical coiled configuration extending from one end to another end in a second direction. Each layer of the first helical coiled configuration overlies a layer of the second helical coiled configuration at multiple intersections to form a single spring unit.

Several options for the spring are as follows. For instance, in one option, the material comprises composite material. In another option, the composite material comprises a polymer impregnated with multiple fibers, for example, carbon fibers. In another option, the first helical coil configuration and the second helical coil configuration are interwoven together. In yet another option, each layer is bonded together.

In another embodiment, a helical spring a multi-helical unit includes a number of layers of composite material disposed in a multi-helical configuration. The multi-helical unit includes layers of at least a first strand, a second strand, a third strand, and a fourth strand of composite material. The first strand is disposed in a first coiled configuration, the second strand is disposed in a second coiled configuration, the third strand is disposed over the first strand and the second strand. The third strand disposed in the first coiled configuration, the fourth strand is disposed over the first strand, second strand, and third strand, and the fourth strand disposed in the second coiled configuration. The first strand, the second strand, the third strand, and the fourth strand bonded together in a single spring unit.

Several options for the helical spring are as follows. For instance, in one option, the first strand, second strand, third strand, and fourth strand comprise a single strand of composite material. In another option, the helical spring further includes a fifth strand and sixth strand of composite material, where the fifth strand disposed in a third coiled configuration between the second strand and the third strand, and the sixth strand disposed in the third coiled configuration over the fourth strand of composite material. The composite material optionally comprises polymer material reinforced with a plurality of fibers.

In yet another embodiment, a helical spring includes at least a first set of layers of composite material distributed in a first coiled configuration, the first coiled configuration extending from a first end to a second end. The helical spring further includes at least a second set of layers of composite material distributed in a second coiled configuration, the second coiled configuration extending from one end to another end. The first set of layers and the second set of layers are interwoven together in a crisscross configuration, each layer of the first set of layers overlies a layer of the second set of layers at multiple intersections to form a single spring unit. In addition, the composite material for the first set of layers and the second set of layers comprises a polymer matrix reinforced with a plurality of fibers.

Several options for the helical spring are as follows. For instance, in one option, the helical spring further includes a third set of layers of composite material distributed in a third coiled configuration, where the third set of layers are interwoven with the first set of layers and the second set of layers to form a single spring unit. In another option, the second coiled configuration is offset about 120 degrees from the first coiled configuration, and the third coiled configuration is offset about 120 degrees from the second coiled configuration. In yet another option, the composite material comprises about 30–40% volume of polymer matrix, and about 70–60% volume fiber material, respectively.

In yet another embodiment, a method for forming a spring includes winding m strands of material to form a first layer of composite material in a first helical configuration around a mandrel, winding p strands of material to form a second layer of the composite material coil around the first layer in a second helical configuration, and repeating forming the first layer in the first helical configuration and forming the second layer in the second helical configuration n number of times. The method further includes coupling the layers of material together to form a single spring unit.

Several options for the method are as follows. For instance, in one option, the method further includes winding the first helical configuration in an opposite direction than the second coil. In another option, the method further includes winding a third layer of q strands of material in a third helical configuration around the first layer and the second layer, and repeating winding the first layer in the first helical configuration, winding the second layer in the second helical configuration, and winding the third layer in the third helical configuration n number of times.

Further options include embedding fiber in a polymer prior to winding the first layer and the second layer, or winding the first layer around the mandrel and winding the second layer around the first layer includes continuously winding a single strand of composite material. In yet another option, coupling the layers together includes heating the single spring unit and/or applying pressure to the single spring unit, or curing the single spring unit to form a substantially rigid spring. Still further, in another option, the method further includes decreasing one or more dimensions of the mandrel, and removing the single spring unit from the mandrel. In yet another option, winding the m strands of material and winding the p strands of material comprises winding one or more strands of composite material.

In yet another embodiment, a method for forming a spring includes winding a first layer of a single strand of composite material in a first helical configuration around a mandrel, winding a second layer of the single strand of composite material coil around the first layer in a second helical configuration, winding a third layer of the single strand of composite material in a third helical configuration around the first layer and the second layer, and repeating winding the first layer in the first helical configuration, winding the second layer in the second helical configuration, and winding the third layer in the third helical configuration n number of times. The method further includes coupling the layers of the single strand of composite material together to form a single spring unit.

Several options are as follows. For instance, in one option, the method further includes heating and applying pressure to the single spring unit. In another option, the method further includes reinforcing a polymer with a plurality of fibers to form the composite material. Still further, in another option, winding the first layer includes winding along a first longitudinal direction, and winding the second layer includes winding along a second longitudinal direction, and the first longitudinal direction is opposite the second longitudinal direction.

The spring design allows for use of a lightweight material, without compromising strength or stiffness. The use of composite materials, in conjunction with multi-helical coils, provides for axial stiffness comparable to that of steel. The spring assembly provides for further benefits such as fatigue resistance, high corrosion resistance, and use of optional non-conductive materials.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

A multihelical spring is provided herein which includes two or more coil configurations. Each coil configuration includes one or more strands which are layered over one another. Each strand is formed of a number of materials, for instance, composite material. The composite material includes one or more fibers together with a polymer forming an uncured composite material which is wound, for example, over a mandrel to form the multihelical spring. Optionally, multiple layers are formed and interwoven, for example, by continuously winding the composite material around the mandrel and back and forth around the longitudinal axis of the mandrel. As the layers are wound, each layer optionally crosses over the previous layer, and optionally the first coil configuration forms a right-handed helix and the second coil configuration forms a left-handed helix. Multiple layers of the spring are formed until the desired cross-section is created. The cross-sectional shape of the coil configurations can be varied to achieve different spring strengths and characteristics. One option is to have a circular cross-section of the coil configurations. In another option, the cross-section includes square or rectangular cross-sections. A change from a square cross-section to a rectangular cross-section, for example of a ratio of 2×1, while maintaining the same cross-sectional area, will further increase the overall stiffness by a factor of about 2.5. It should be noted that many variations are possible, and are explained in greater detail below.

Figure 1:
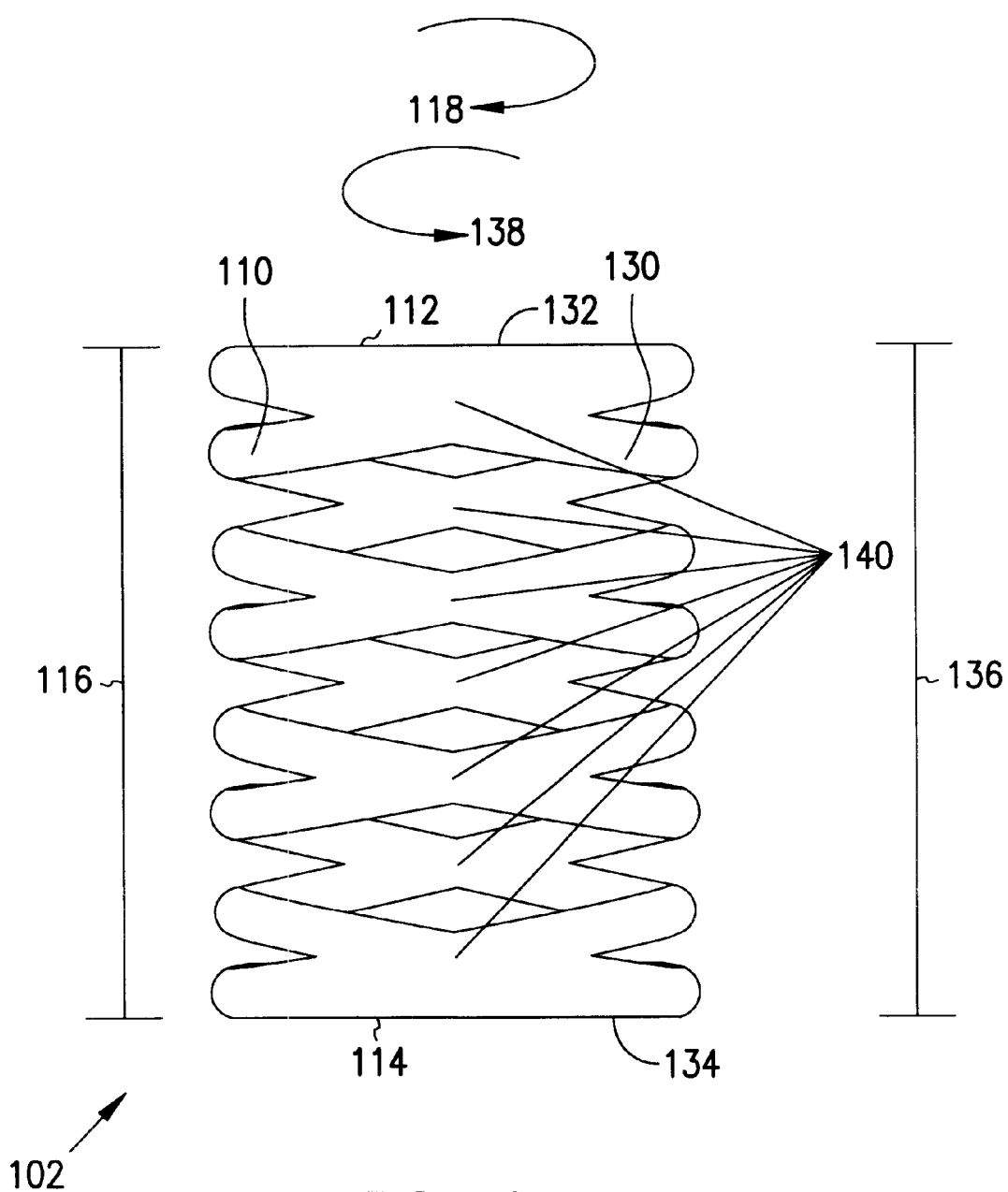
FIG. 1 is a side elevational view illustrating a spring assembly constructed in accordance with one embodiment.

A helical spring 102, as shown in FIG. 1, includes one or more layers of material distributed in a first helical coil configuration 110, and one or more layers of material distributed in a second helical coil configuration 130. The one or more layers includes one or more strands of material, as further described below. The first helical coil configuration 110 extends from a first end 112 to a second end 114, and is defined in part by a first length 116. The first helical coil configuration 110 is wound in a first direction 118. The second helical coil configuration 130 extends from a first end 132 to a second end 134, and is defined by a second length 136. In one option, the first length 116 is substantially the same as the second length 136.

In another option, the first helical coil 110 is wound with respect to the second helical coil configuration 130 such that the first end 112 of the first helical coil 110 is offset about 180 degrees from the first end 132 of the second helical coil configuration 130. It should be noted that other offset angles are suitable as well. Symmetrical springs can be made with an even number of coil configurations, for example, with one half of the coils wound in one direction, and one half wound in the opposite direction, optionally having substantially the same pitch. Asymmetrical springs are possible as well. For symmetrical springs, the helical coil configurations that are wound in the same direction are optionally parallel to each other, and are evenly distributed around the axis of the spring, depending on the total number of coil configurations. For example, if there are two coil configurations, each coil is optionally wound at the same pitch, but in an opposite direction. In another example, if there are four coil configurations, two coils wound in each direction, the two coils wound in each direction are spaced 180 degrees apart. In another example, if there are six coil configurations, three coils wound optionally parallel in each direction, the three coils wound in each direction are spaced 120 degrees apart. In general, a symmetrical spring with a total of 2n coil configurations will have n coils wound in one direction and n coils wound in the opposite direction, at optionally the same pitch, and the n coils wound in each direction will be optionally parallel and spaced 360/n degrees apart. The spring 102 can be formed of r coil configurations, as discussed further below.

In yet another option, the winding of the first helical coil configuration 110 is uniform with the second helical coil configuration 130, for example, where the pitch is substantially the same for the first helical coil configuration 110 and the second helical coil configuration 130. Alternatively, the first helical coil configuration 110 has a different pitch than the second helical coil configuration 130. Advantageously, the number of coil configurations, and/or the direction and angles of the coil configurations can be adjusted to create springs with different properties.

The one or more layers of the first helical coil configuration 110 and the one or more layers of the second helical coil configuration 130 overlie one another at multiple locations 140. The first helical coil configuration 110 and the second coiled configuration 130 are bonded together sufficient to hold the crossing configuration together with sufficient strength to not break during twisting, compression, or extension of the spring. Examples of bonding include, but are not limited to, interweaving, curing, welding, adhesive bonding, etc. When multiple layers are present, the layers are interwoven together where each layer of the first set of layers overlies a layer of the second set of layers at multiple intersections 140 to form a single spring unit, as further discussed below. The second helical coil configuration 130 is wound with the first helical coil configuration 110, for example, in a second direction 138, which in one option, is in an opposite direction than that of the first direction 118. In a further option, the first helical coil configuration 110 and the second helical coil configuration 130 form a crisscross configuration. The first direction 118 is the same as the second direction 138 in a further option. In yet another option, the first helical coil configuration 110 and the second helical coil configuration 130 cross at least at one location 140 by having a different pitch, or by being offset at the first end of the spring.

Each layer of the first helical coil configuration 110 is coupled with each layer of the second helical coil configuration 130. In one option, the first set of layers of the first helical coil configuration 110 and the second set of layers of the second helical coil configuration 130 are bonded together. In one embodiment, the coupling process includes curing materials used for the composite material with time and/or heat treatment. Other methods for coupling the layers of the first helical coil configuration 110 with the layers of the second helical coil configuration 130 include, but are not limited to, pressure, adhesive, welding, laser processing, molding processes, or ultrasonic welding. One or more methods, or combinations thereof are suitable for coupling the layers of the first helical coil configuration 110 with the layers of the second helical coil configuration 130.

In one option, the first helical coil configuration 110 and/or the second helical coil configuration 130 are formed of non-composite materials, such as metal or plastic. To couple the non-composite materials at locations 140, the materials are bonded together, for example, by welding or riveting the coil configurations together. In another option, the first and second helical coil configurations 110, 130 are cast or injection molded to form a unitary spring having sufficient axial stiffness. Further processing options, such as annealing, are provided to achieve a multihelical spring having sufficient axial stiffness.

The first helical coil configuration 110 and/or the second helical coil configuration 130, in another option, are formed of layers of composite material, which beneficially allows for the helical spring to be lightweight. The composite material comprises, in one option, a non-metallic material which further allows the helical spring to be non-corrosive, which is essential in certain applications. In a further embodiment, the composite material is formed of non-conductive materials.

The composite material, in one option, includes a first material embedded within a second material. For example, one or more fibers are embedded within polymer material to form a strand of material. It should be noted that the fiber is not necessarily parallel to the direction of the coil configuration. For some applications, the fibers may be at an angle with respect to the direction of the coil configuration. The fibers include a plurality of fibers, for example, several thousands of fibers of very small diameter. For instance, carbon fibers have a diameter of about 6.5 microns. In another example, the composite material comprises a polymer material reinforced by a fiber material. Suitable materials for the fiber material include, but are not limited to, carbon, or graphite fiber, glass fiber, aramid fiber, or other synthetic fibers. Suitable materials for the polymer material include, but are not limited to, thermosets, thermoplastic materials, or materials which harden after heat treatment or time. In a further option, the composite material comprises two or more materials brought together by the following processes, listed only by way of example, and not in a limiting sense: coating, embedding, impregnating. In yet another option, a wide range of tow-pregs are available, for example, having a range of 1k up to 48k tow count. A larger tow count would be suitable for a larger cross-section or a larger coil diameter, such as for industrial applications.

Alternatively, the composite materials can be produced by forming a strand of composite material by extrusion, and then forming the strand into the helical shape, or into the multiple helical coils. Furthermore, the amounts of each material can be modified as necessary. For example, in one option, about 30% of polymer material and about 70% of fiber material is used for each helical coil. In another option, about 40% of polymer material and about 60% of fiber material is used for each helical coil. Other embodiments include ranges of about 30–40% volume of polymer material, and about 70–60% volume of fiber material, respectively.

Figure 2:
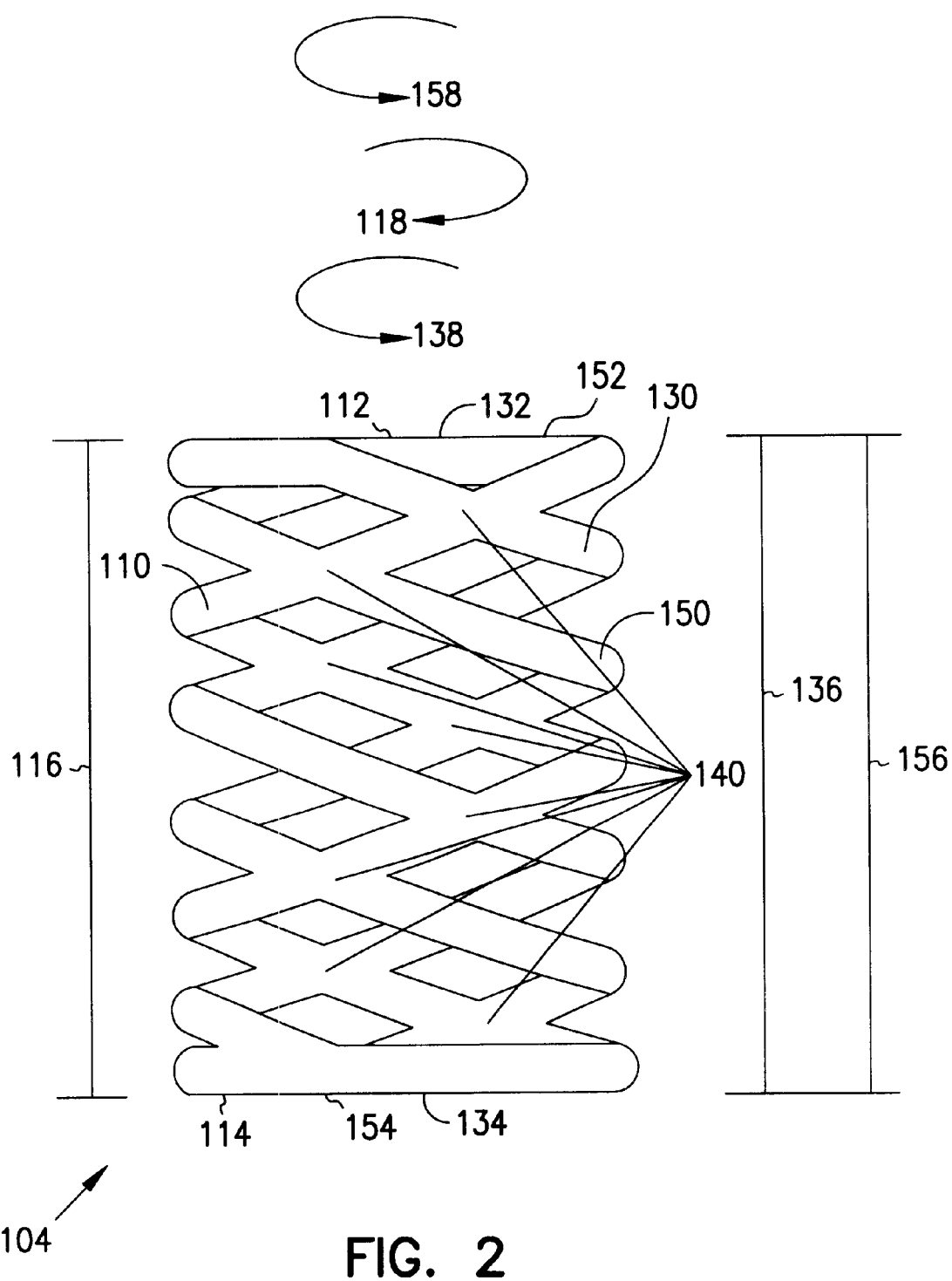
FIG. 2 is a side elevational view illustrating a spring assembly constructed in accordance with yet another embodiment.
Figure 3:
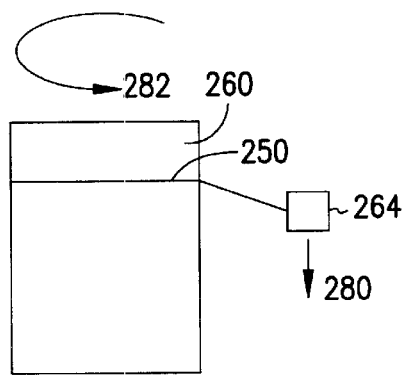
FIG. 3 is a block diagram illustrating an apparatus for forming a spring assembly constructed in accordance with another embodiment.
Figure 4:
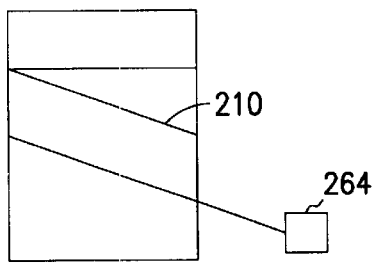
FIG. 4 is a block diagram illustrating an apparatus for forming a spring assembly constructed in accordance with another embodiment.
Figure 5:
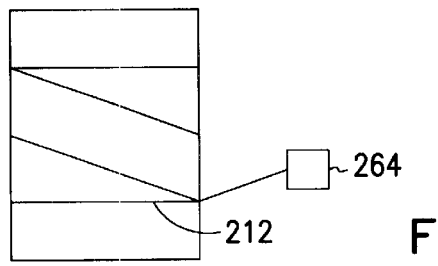
FIG. 5 is a block diagram illustrating an apparatus for forming a spring assembly constructed in accordance with another embodiment.
Figure 6:
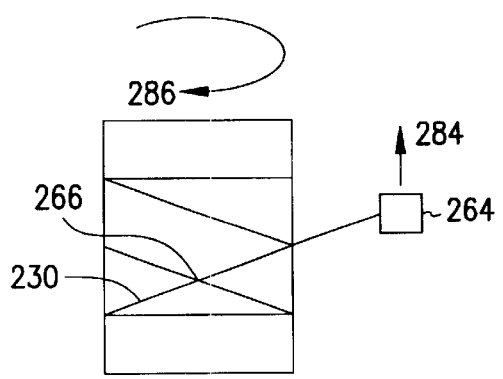
FIG. 6 is a block diagram illustrating an apparatus for forming a spring assembly constructed in accordance with another embodiment.
Figure 7:
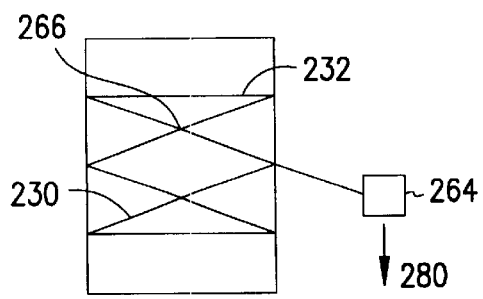
FIG. 7 is a block diagram illustrating an apparatus for forming a spring assembly constructed in accordance with another embodiment.

Referring to FIG. 2, a helical spring 104 is shown which includes multiple helical coil configurations. For instance, the helical spring 104 includes the first helical coil configuration 110 and the second helical coil configuration 130 as described above. The helical spring 104 further includes a third set of layers distributed in a third helical coil configuration 150 which are interwoven with the first set of layers of the first helical coil configuration 110 and the second set of layers of the second helical coil configuration 130. The third helical coil configuration 150 is wound in a third direction 158, which in one option, is in an opposite direction than that of the first direction 118 of the first helical coil configuration 110. In another option, the third helical coil configuration 150 is wound in an opposite direction than that of the second direction 138 of the second helical coil configuration 130. In a further option, the first helical coil configuration 110, the second helical coil configuration 130, and the third helical coil configuration 150 form a crisscross configuration.

The third helical coil configuration 150 extends from a first end 152 to a second end 154, and is defined by a third length 156. In one option, the third length 156 is substantially the same as the first length 116 and/or the second length 136. In another option, the first helical coil configuration 110 is wound respect to the second helical coil configuration 130 and the third helical coil configuration 150 such that the first end 112 of the first helical coil configuration 110 is offset about 120 degrees from the first end 132 of the second helical coil configuration 130, and the first end 132 of the second helical coil configuration 130 is offset about 120 degrees from the first end 152 of the third helical coil configuration 150.

The third helical coil configuration 150 is optionally formed of composite material, which beneficially allows for the helical spring to be lightweight. The composite material comprises a non-metallic material which further allows the helical spring to be non-corrosive, which is essential in certain applications. The material for the third helical coil configuration 150 includes, but is not limited to, the materials discussed above for the first and second helical coil configurations 110, 130.

FIGS. 3–7 illustrate an apparatus for forming the above described helical spring, and the various embodiments. Composite material 250 is fed to a mandrel 260 in a first longitudinal direction 280. The composite material 250 is formed by impregnating fibers with a polymer just prior to feeding the composite material 250 to the mandrel 260. Alternatively, preimpregnated fibers can be used. The composite material 250 is fed to the mandrel 260 with a feeder head 264, which allows for the composite material 250 to be wound around the mandrel 260 in a first direction 282, to form a first helical coil configuration 210. The composite material 250 is wound in a helical configuration over a length of the mandrel 260, which will be the length of the helical spring.

When the winding of the first coil 210 is complete, a full circle is wound at 212. The feeder head 264 then travels in a second longitudinal direction 284 such that a second coil configuration 230 is wound over the first coil configuration 210, and the second coil configuration 230 is wound in a second direction 286, which is in an opposite direction than the first coil configuration 210.

The feeder head 264 translates relative to the mandrel 260 in a number of manners. In one option, the mandrel 260 rotates, although does not move along its longitudinal axis, and the feeder head 264 translates as shown in FIGS. 3–7. In another option, the feeder head 264 and the mandrel 260 each translate along their respective longitudinal axis. In yet another option, the feeder head 264 optionally remains fixed, and the mandrel 260 rotates and translates simultaneously.

The second coil configuration 230, in one option, is an offset helix relative to the first coil configuration 210, where the second coil configuration 230 forms a crisscross configuration with the first coil configuration 210. At the end of the second coil configuration 230, a full circle is wound at 232, similar to that at 212. Winding the full circles of material at the ends of the helical spring allows for increased stability of the helical spring, and further allows for use of a continuous strand of composite material.

Springs having coil configurations with larger cross-sections can be formed by repeating the above process n number of times, and winding the composite material 250 over and over again to form multiple layers of first coil configurations 210 and multiple layers of second coil configurations 230, which are interwoven together. The individual layers are coupled together, for instance by bonding, curing, and/or processing to ensure that coupling takes place.

The pitch of the helical spring is determined by the speed of the feeder head 264 relative to the mandrel 260. Springs with triple coils are made similarly as described above. Optionally, the spring coil configurations are offset 120 degrees from one another.

Further options for the above and below discussed spring assemblies involve composite material of variable cross-section or a helical spring having a variable coil section. Furthermore, spring assemblies having variable pitch, conical springs, barrel springs, or other shapes, can be made by changing the configuration of the mandrel 260.

Figure 8:
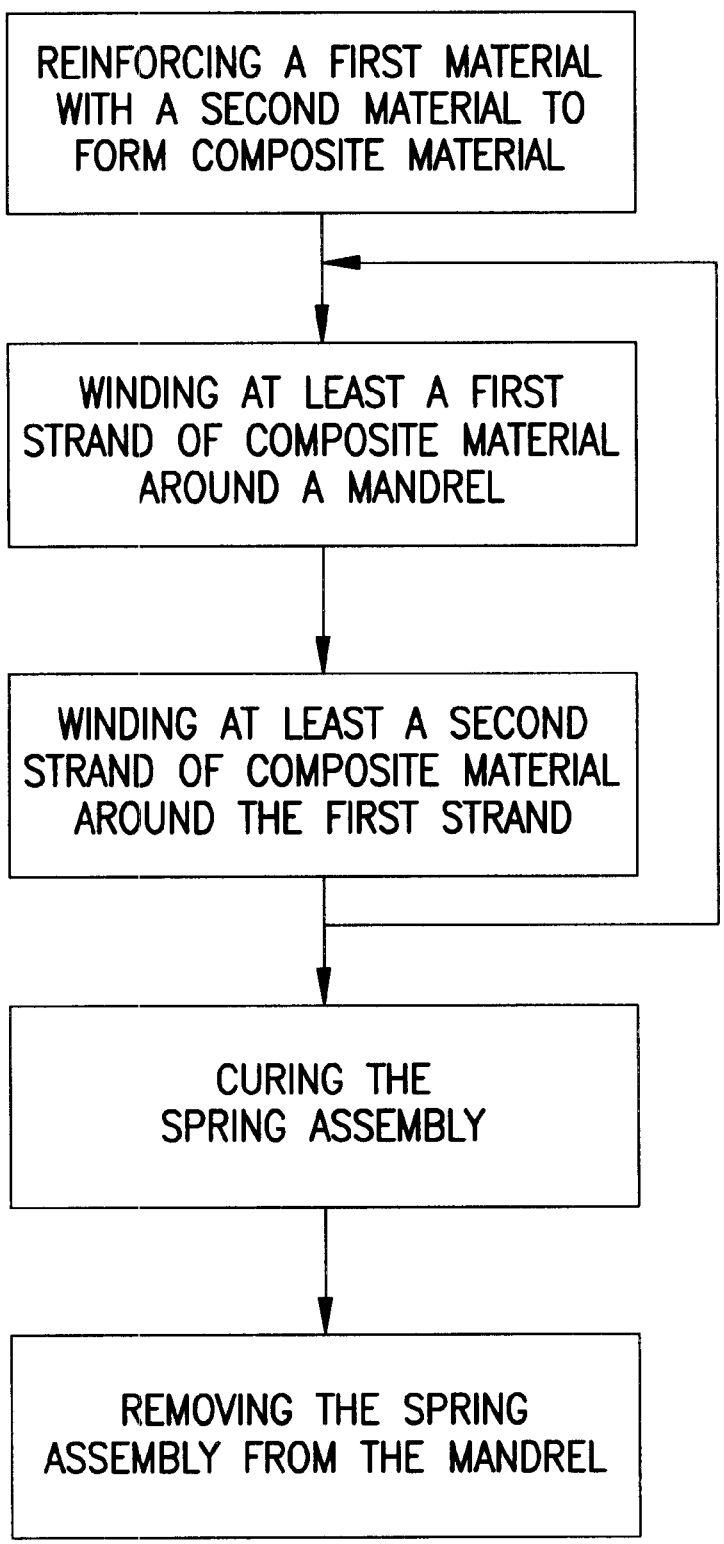
FIG. 8 is a block diagram illustrating method for forming a spring assembly in accordance with one embodiment.

A method for forming the helical spring is shown, by way of example, in FIG. 8. Further details and options are as follows. A helical spring is formed, for example, using composite material. It should be noted that other materials, such as non-composite materials, are suitable as well. The composite material is formed, for example, of two different materials, where a first material is embedded in a second material. In another example, the first material is impregnated with the second material. To form the composite material, in one example, a plurality of fibers are collectively pulled through a second material, such as polymer material. For example, multiple fibers are pulled through a ½ inch tube having a curve, where the tube is filled with a polymer such as epoxy. As the fibers are pulled through the polymer, the polymer coats the fiber material. In another option, bulk raw composite material is used. The composite material is guided through a shifting bar and is wound on to a rotating mandrel.

The composite material is wound on to the rotating mandrel to form a helical spring. For example, m strands of material are wound in a first coil configuration on to a mandrel to form a first layer, and p strands of material are wound in a second coil configuration over the first coil configuration to form a second layer. The spring further can include two or more coil configurations. The first coil configuration, in one option, is opposite than the second coil configuration. It should be noted that m and p include one or more strands, and that m is not necessarily the same as p. The process is repeated n number of times to form n layers of material, depending on the desired structural qualities of the spring. As the process is repeated, the layers become interwoven together. For instance, a first strand is disposed in the first coiled configuration, a second strand is disposed in the second coiled configuration, the third strand is disposed in the first coiled configuration over the second strand, a fourth strand is disposed in the second coiled configuration over the third strand, and so on. The coil configurations cross each other and are coupled together at multiple locations, for example, where the layers criss-cross one another.

Figure 9:
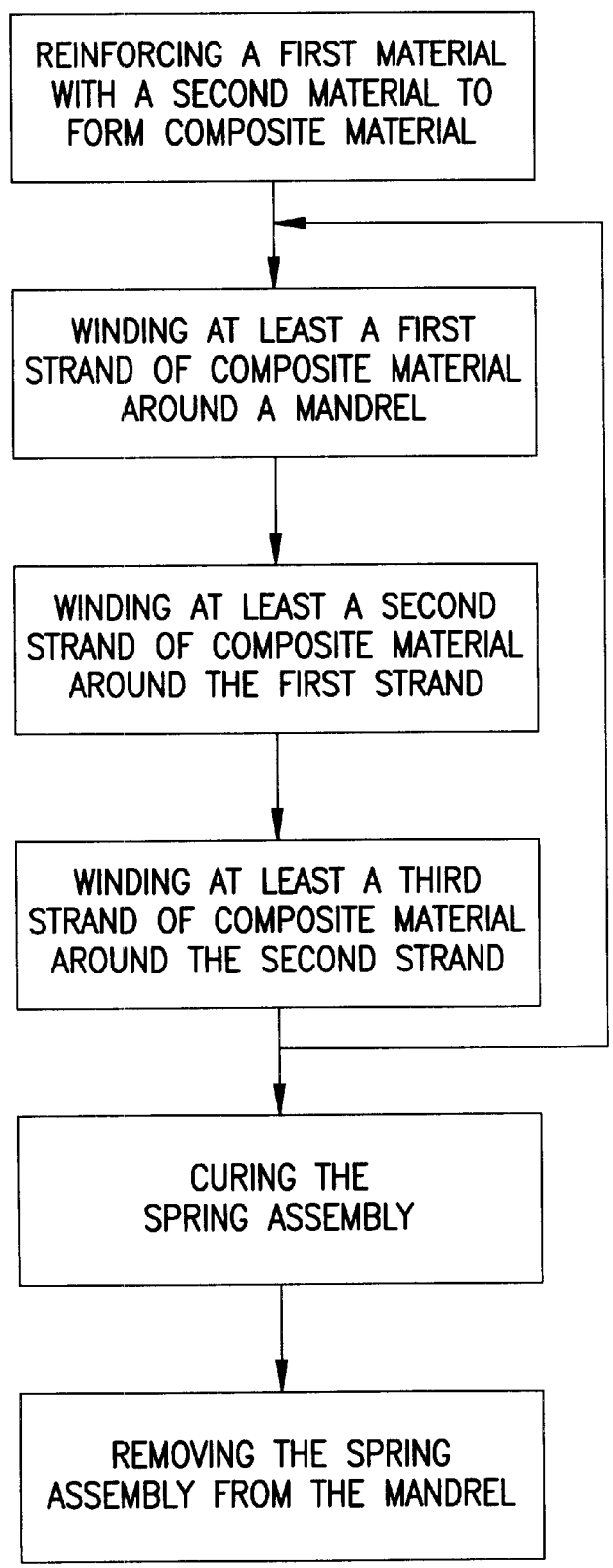
FIG. 9 is a block diagram illustrating method for forming a spring assembly in accordance with one embodiment.

In a further option, as shown in FIG. 9, q strands of material, such as composite material, is/are wound on to and around the first and second coil configurations to form a third coil configuration. This process is repeated n number of times to form multiple layers of composite material. For instance, a first strand is disposed in the first coiled configuration, a second strand is disposed in the second coiled configuration, the third strand is disposed in the first coiled configuration over the second strand, a fourth strand is disposed in the second coiled configuration over the third strand, a fifth strand is disposed in a third coiled configuration between the second strand and the third strand, and a sixth strand is disposed in the third coiled configuration over the fourth strand, and so on. It should be noted that multiple strands can be used for each layer. The third coil configuration is optionally wound around the mandrel in a direction that is opposite to the first and/or second coil configurations. This process can be extended to r coil configurations.

The strands of material are wound around a rotating mandrel, and are done so at substantially the same speed to assist in maintaining uniformity of the helical windings. After the strands are wound on to the mandrel in a helical configuration, the helical spring is processed to couple the first helical coil configuration with the second helical coil configuration, and if necessary, to couple the third helical coil configuration or additional helical coil configurations with the first and second helical coil configurations. For example, the coil configurations are bonded together.

In another option, the coil configurations are cured, for example by heating and/or applying pressure to the coil configurations to bond the polymer material of one coil configuration with another coil configuration. In another option, the coil configurations are cured over time. After the coil configurations are cured, the helical spring is removed from the mandrel. The mandrel is formed of metal, which in one option has a higher coefficient of thermal expansion than the helical spring. The coil configurations are removed from the mandrel by heating the mandrel, thereby expanding the mandrel. After the mandrel has cooled, the mandrel has an outer diameter which is less than the cured inner diameter of the helical spring. After the forming process, the helical spring is ready for implementation into a wide variety of applications.

The helical spring described herein is suitable for use in many different applications. For instance, the helical spring is suitable in, chemical processing and refining equipment, automotive industry such as automobile suspensions, bumper springs, bicycles, electrical devices, aerospace industry, or marine engines and other water craft applications, where corrosion is a problem.

The multi-helical spring further allows for the spring to be engineered, for example, with a failure mode. For instance, the spring can be designed with specific failure characteristics. A helical spring having six helical coil configurations, where one or two of the helical coil configurations are designed to fail non-catastrophically, provides a gradual failure and/or a visual indicator that failure of the spring is imminent. For example, one helical coil can be made thinner, with a notch, or with a failure point. Alternatively, the coil can include a sensor or having electricity run through it. The composite materials allow for advanced engineering of the spring to occur.

Advantageously, the helical spring allows for use of a lightweight material, while providing adequate stiffness. The use of composite materials, in conjunction with multi-helical coil configurations as described above, allows for the high axial stiffness and strength of the fibers to be exploited, and provides for a helical spring having axial stiffness comparable to that of steel. The coil configurations of the above described helical composite spring resist by bending and torsion, instead of resisting only by torsion as achieved by conventional springs, which allows for use of the lightweight composite materials while providing stiffness similar to that of single helical steel springs.

Calculations illustrating the increase in stiffness for the composite helical spring are as follows. It should be noted that for a single helical spring (a torsion bar in a helical configuration) the external work is:

$$W = (\text{Force}) \times (\text{Displacement}),$$

where F=force acting on spring and d=deflection or change in length of the spring while subjected to force F. When it is assumed that the total external work done on the spring, W is being stored (in the spring) in the form of elastic strain energy U, such that $$W = U \qquad (1)$$

In the case of a single helical spring, it is further assumed that $$U = U_T \qquad (2)$$

where $U_T$ is the torsional strain energy. Furthermore, $U_T = T^2 L / 2GJ$, where T=torsion moment, L=length of the coil, G=the modulus of rigidity or the shear modulus of the material, and J=torsional constant. It should be further noted that for a coil of circular cross-section of radius c, the torsional constant $J = \pi c^4 / 2$. In addition, it should be noted that the torque is a function of F. For example, in the case of single helical spring torque=R×F, where R is the radius of the coil.

Assuming that the total external work done on the spring is being stored in the form of elastic strain energy, $$W = U_T \qquad (3)$$

Thus, the external work $F \times d = T^2 L / 2GJ$.
And the axial stiffness of the spring is $$K = 1/d = GJ/C_T, \qquad (4)$$

where $C_T$ is a function of the applied force and of the geometry of the spring.

The stiffness is proportional to G as the material property. G for steel is about $11 \times 10^6$ psi, which is about 40% of E, the modulus of elasticity for steel. For carbon composite materials G is only about 5% of E. For carbon fiber reinforced polymer composites, the value of G is about 10 times lower than the value of G for steel. Thus, a single helical spring made of composite material will have about 10 times lower stiffness than an identical spring made of steel. However, the $E_{composites}$ is not much lower than $E_{steel}$, for example, with respect to commercially available carbon composites, $E_{composites}$ along the fiber direction is about 70% of $E_{steel}$.

In the case of a double helical spring as described above, the strain energy is the sum of torsional strain energy and of bending strain energy. Thus equation (3) becomes $$U = U_T + U_M \tag{5}$$

with the $U_M = M^2 L/2EI$. Note that the bending moment M is also a function of F and the geometry of the spring (radius of the coil, helical angle, crisscross connection, etc). Now the stiffness of the spring can be expressed as $$K = 1/d = GJ/C_T + EI/C_M \tag{6}$$

Thus, for a double helical spring, the stiffness is the sum of the torsional stiffness and bending stiffness, with the bending stiffness the dominant term. As above, the coefficient $C_M$ is a function of the applied force and the geometry of the spring.

The helical spring provides for further benefits such as fatigue resistance, high corrosion resistance, and use of optional non-conductive materials. Furthermore, the above described helical spring can be made more cost effectively and/or has improved ease of manufacturability than conventional steel or composite springs. In applications, the helical spring allows for the overall weight of the device to be reduced, resulting in energy savings.

It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present invention. The scope of the invention should, therefore, be determined with reference to the appended claims, along with the full scope of equivalents to which such claims are entitled.

What is claimed is:

1. A helical spring comprising:
   one or more layers of material distributed in a first helical coiled configuration, the first helical coiled configuration extending from a first end to a second end and wound in a first direction; two or more layers of material distributed in a second helical coiled configuration, the second helical coiled configuration extending from one end to another end in a second direction; and
   each layer of the first helical coiled configuration is disposed between layers of the second helical coiled configuration at multiple intersections to form a single spring unit.

2. The helical spring as recited in claim 1, wherein each of the layers of material comprise composite material.

3. The helical spring as recite in claim 2, wherein the composite material comprises a polymer impregnated with one or ore fibers.

4. The helical spring as recite in claim 1, wherein the second direction is different than the first direction.

5. The helical spring a recited in claim 1, wherein the layers of the first helical coil configuration and the layers of the second helical coil configuration are interwoven together.

6. The helical spring a recited in claim 1, wherein each layer of the first helical coiled configuration and the second helical coiled configuration is bonded together at multiple locations.

7. A helical spring comprising:
   a multi-helical unit including a number of layers of composite material disposed in a multi-helical configuration,
   the multi-helical unit including layers of at least a first strand, a second strand, a third strand, and a fourth strand of composite material;
   the first strand disposed in first coiled configuration, the second strand disposed in a second coiled configuration, the third strand disposed over the first strand and the second strand, the third strand disposed in the firs coiled configuration;
   the fourth strand disposed over the first strand, second strand, and third strand, the fourth strand disposed in the second coiled configuration; and
   the first strand, the second strand, the third strand, and the fourth strand interwoven and bonded together in a single spring unit.

8. The helical spring as recite in claim 7, wherein the first strand, second strand, third strand, and fourth strand comprise single strand of composite material.

9. The helical spring as recite in claim 7, further comprising a fifth strand and sixth strand of composite material, the fifth strand disposed in a third coiled configuration between the second strand and the third strand, he sixth strand disposed in the third coiled configuration over the fourth strand of composite material.

10. The helical spring as recite in claim 9, wherein the first strand, second strand, third strand, fourth strand, fifth strand, a d sixth strand comprise a single strand of composite material.

11. The helical spring as recite in claim 7, wherein the first coiled configuration is a winding having a first direction and the second coiled configuration is a winding having a second direction, and the first direction is different than the second direction.

12. The helical spring as recite in claim 7, wherein the composite material comprises polymer material reinforced with a plurality of fibers.

13. A helical spring comprising:
   at least a first set of layers of composite material distributed in a first coiled configuration, the first coiled configuration extending from a first end to a second end;
   at least a second set of layers of composite material distributed in a second coiled configuration, the second coiled configuration extending from one end to another end;
   the first set of layers and th second set of layers interwoven and bonded together in a crisscross configuration, each layer of the first set of layers overlies a layer of the second set of layers at multiple intersections to form a single spring unit; and
   the composite material for he first set of layers and the second set of layers comprising a polymer matrix reinforced with a plurality of fibers.

14. The helical spring as recite in claim 13, further comprising a third set of layers of composite material distributed in a third coiled configuration, the third set of layers interwoven with the first set of layers and the second set of layers to form a single spring unit.

15. The helical spring as recite in claim 14, wherein the second coiled configuration is offset about 120 degrees from the first coiled configuration, and the third coiled configuration is offset about 120 degrees from the second coiled configuration.

16. The helical spring as recite in claim 13, wherein the composite material comprises about 30-40% volume of polymer matrix, and about 70-60% volume fiber material, respectively.

* * * * *